(12) United States Patent
Lapujade

(10) Patent No.: US 9,487,306 B2
(45) Date of Patent: Nov. 8, 2016

(54) METHOD OF COLOR MIXING FOR AN AVIATION ANTI-COLLISION LIGHT

(71) Applicant: Philippe Lapujade, Chandler, AZ (US)

(72) Inventor: Philippe Lapujade, Chandler, AZ (US)

(73) Assignee: GOODRICH LIGHTING SYSTEMS, INC, Phoenix, AZ (US)

(*) Notice: Subject to any disclaimer, the term of this patent is extended or adjusted under 35 U.S.C. 154(b) by 0 days.

(21) Appl. No.: 14/324,714

(22) Filed: Jul. 7, 2014

(65) Prior Publication Data

US 2014/0355281 A1 Dec. 4, 2014

Related U.S. Application Data

(62) Division of application No. 13/706,910, filed on Dec. 6, 2012, now abandoned.

(51) Int. Cl.
*B64D 47/02* (2006.01)
*B64D 47/06* (2006.01)

(52) U.S. Cl.
CPC ........... *B64D 47/06* (2013.01); *B64D 2203/00* (2013.01)

(58) Field of Classification Search
CPC .. B64D 47/06; B64D 2203/00; G08G 5/045; G08G 5/0021; G08G 5/0078; G08G 5/04
USPC ................................ 362/470; 340/961, 982
See application file for complete search history.

(56) References Cited

U.S. PATENT DOCUMENTS

| 5,293,304 | A | 3/1994 | Godfrey |
| 6,244,728 | B1 | 6/2001 | Cote et al. |
| 6,507,290 | B1 | 1/2003 | Lodhie et al. |
| 7,802,901 | B2 | 9/2010 | McMillan |
| 2006/0007013 | A1 | 1/2006 | Singer et al. |
| 2007/0145915 | A1 | 6/2007 | Roberge et al. |
| 2009/0010013 | A1* | 1/2009 | Hessling ............... B64D 47/06 362/470 |
| 2010/0046241 | A1 | 2/2010 | Lundberg et al. |
| 2011/0164429 | A1 | 7/2011 | Heym et al. |
| 2014/0160774 | A1* | 6/2014 | Lapujade ..................... 362/470 |

OTHER PUBLICATIONS

"Anti-Collision Light System Dual Color; 2000 Candles White or 150 Candles Red." North American Operations Goodrich Lighting Systems, Inc.; Published Jul. 1, 2005; pp. 1-2.
"The Automatic Detection of Anti-Collision Lights." by B.A. Wyndham. Ministry of Defence, RSRE Malvern, Worcs. Published Feb. 1989. pp. 1-22.

* cited by examiner

*Primary Examiner* — Andrew Coughlin
*Assistant Examiner* — Meghan Ulanday
(74) *Attorney, Agent, or Firm* — Cantor Colburn LLP

(57) ABSTRACT

A dual-color aviation Anti Collision Light (ACL) has a first set of LEDs that emit a substantially white beam of light and a second set of LEDs that emit a substantially red beam of light. The ACL can be operated in a first mode in which the red LEDs are excited by themselves so that the ACL produces a red beam of light In a second mode, the white LEDs and the red LEDs are excited simultaneously to produce a white beam of light having a chromaticity within the definition of Aviation White. Operating the red LEDs in the white mode has two synergistic effects. First, the red LEDs augment the luminous output of the white LEDs so that fewer white LEDs are required, thus saving cost and space. Second, the red LEDs shift the chromaticity of total light output toward the red region. This has the effect of compensating for the tendency of the white LEDs to become greener with age.

9 Claims, 3 Drawing Sheets

−PRIOR ART−

METHOD OF COLOR MIXING FOR AN
AVIATION ANTI-COLLISION LIGHT

RELATED APPLICATION

This application claims priority to U.S. patent application Ser. No. 13/706,910, filed on Dec. 6, 2012, the entire contents of which is hereby incorporated by reference.

BACKGROUND OF THE INVENTION

This invention relates generally to aviation equipment and, in particular, to aviation lights.

Dual-color anti-collision lights (ACLs) are used in numerous aviation applications, including the Royal Air Force, Australian, New Zealand, and United States Air Forces as well as numerous civilian applications. Typically, dual-color ACLs incorporate a white strobe having an effective luminescence of 1500-2500 cd for daytime operations and a red strobe having effective luminescence of 150-250 cd for nighttime operations. According to federal regulations and various international agreements, the chromaticity of the white strobe must meet the definition of "Aviation White" as defined, among other places, in Federal Acquisition Regulations (FAR) 25.1397. Similarly, the chromaticity of the red strobe must meet the definition of "Aviation Red" as defined by FAR 25.1397.

Conventional dual-color ACLs employ xenon flash tubes to provide the desired light output and chromaticity. A first xenon flash tube is positioned at the focus of a reflector positioned behind a clear lens to provide the white strobe output. A second xenon flash tube is positioned at the focus of a reflector positioned behind a red filter. Conventional dual-color ACLs have a limited operational life, require a comparatively heavy high-voltage power supply to operate the flash tubes, and must contain two separate optical systems, one each for the white and red strobes.

Light Emitting Diodes (LEDs) offer the advantage of improving reliability, reducing power consumption, and reducing the weight of a dual-color ACL. Achieving the desired effective luminescence, however, requires the use of multiple relatively costly LEDs in place of a single xenon flash tube. Moreover, it is well known that white LEDs, which use a phosphor conversion to convert light output from a blue LED die into white light, exhibit a color shift with age and temperature. The effect is to cause the white LEDs to produce light that is more greenish as the phosphor deteriorates. As a result, a white LED that initially has a chromaticity within the definition of Aviation White may, over time, color shift so that it is no longer in compliance with applicable regulations.

SUMMARY OF THE INVENTION

The present invention comprises a dual-color ACL having a first set of LEDs that emit a substantially white beam of light and a second set of LEDs that emit a substantially red beam of light. According to an illustrative embodiment, the ACL is capable of being operated in two modes. In one mode, the red LEDs are excited by themselves so that the ACL produces a red beam of light having a chromaticity within the definition of Aviation Red and a luminous output of 150-250 cd. In the second mode, the white LEDs and the red LEDs are excited simultaneously to produce a white beam of light having a chromaticity within the definition of Aviation White and a luminous output of 1500-2500 cd. Operating the red LEDs in the white mode has two synergistic effects. First, the red LEDs augment the luminous output of the white LEDs so that fewer white LEDs are required, thus saving cost and space. Second, the red LEDs shift the chromaticity of total light output toward the red region. This has the effect of compensating for the tendency of the white LEDs to become greener with age. In one embodiment, the white LEDs, when new, produce light with a chromaticity that is outside the definition of Aviation White but, when color-mixed with the red LEDs, the total light output is within the definition of Aviation White. Utilizing LEDs that are arranged for color mixing also has the advantage of requiring only a single optical system as opposed to the two optical systems required by the prior art ACLs.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
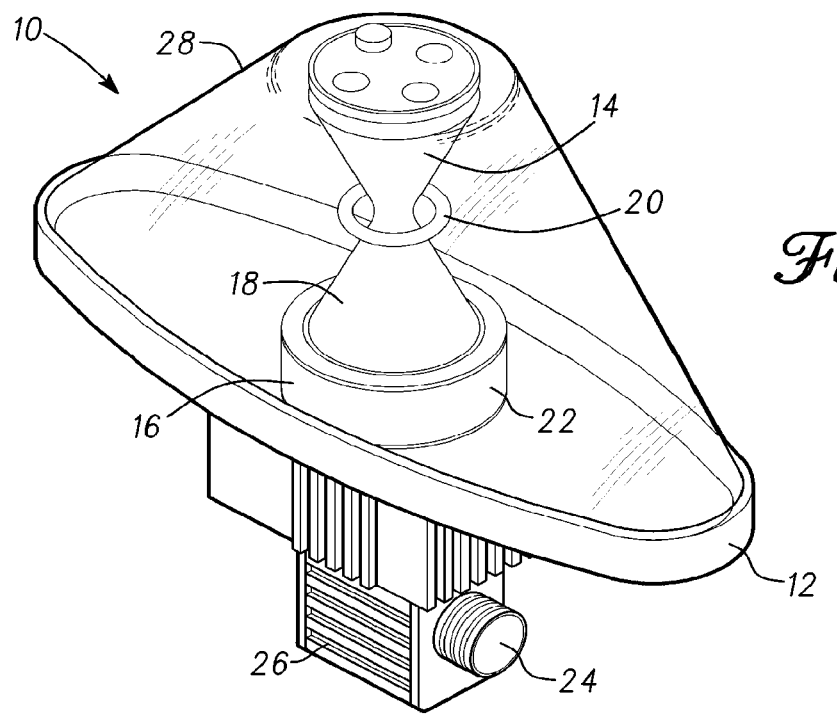
FIG. 1 is a perspective view of a prior art Anti-Collision Light

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIG. 1, a conventional dual color ACL such as NATO stock number 6220-12-187-5292 (shown generally at reference 10) comprises a housing 12 to which is mounted a first optical unit 14 and a second optical unit 16. First optical unit 14 comprises a reflector 18 formed in the shape of a body of revolution having a parabolic or hyperbolic cross section. A xenon flash tube 20 is located at the focal line of reflector 18 so that light emitted from xenon flash tube 20 is reflected out substantially parallel in all radial directions. Second optical unit 16 comprises a second xenon flash tube (not shown) housed within a red optical filter 22. ACL 10 further comprises a connector 24 adapted to receive power from the aircraft's power system (typically 24 V) and a high-voltage power supply 26 which converts the 24 V input into the high-voltage necessary to operate the xenon flash tube. A clear lens 26 encloses first optical unit 14 and second optical unit 16. When ACL 10 is operated in the white mode, first xenon flash tube 20 produces Aviation White light having effective luminous output in the range of 1500-2500 cd. When ACL 10 is operated in the red mode, the second xenon flash tube produces sufficient white light so that the filtered red output will be Aviation Red having effective luminescence of 150-250 cd.

Figure 2:
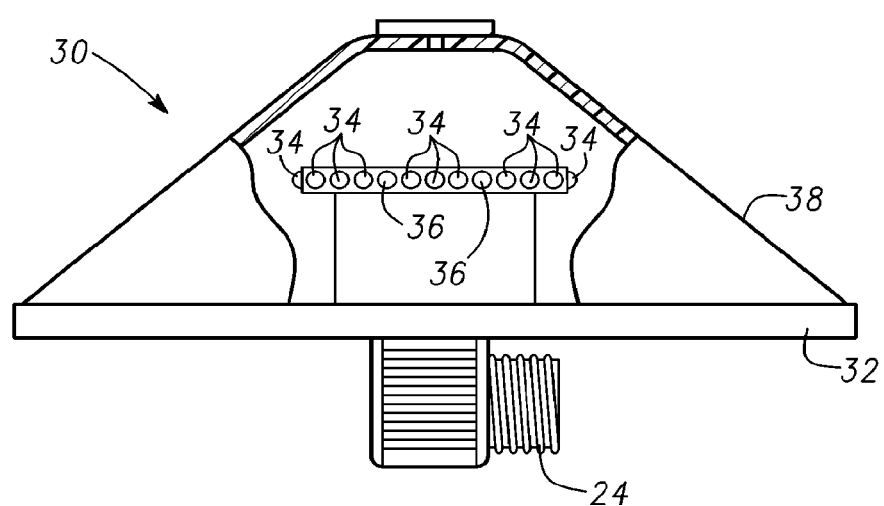
FIG. 2 is a side view of an Anti-Collision Light incorporating features of the present invention.

With reference to FIG. 2, an ACL 30 incorporating features of the present invention comprises a housing 32 to which is mounted a plurality of white LEDs 34 and a plurality of red LEDs 36. In the illustrative embodiment of FIG. 2, the white LEDs 34 and the red LEDs 36 are arranged in a single plane so that light from the LEDs is emitted radially outward without the use of a reflector, however, multiple rows of LEDs with or without reflectors are within the contemplation of the present invention. Accordingly, the invention should not be considered as limited to a particular physical structure. ACL 30 further comprises a clear lens 38 and a connector 24 to connect ACL 30 to the aircraft's power supply.

In the illustrative embodiment of FIG. 2, the white LEDs outnumber the red LEDs by a ratio of approximately 4 white LEDs for every red LED, however for reasons that will be discussed more fully hereinafter, this ratio may be varied depending on the circumstances. The red LEDs 36 may be any conventional red LED having sufficient luminous output and chromaticity within the definition of Aviation Red, which is defined by the following formula on the 1931 C.I.E. Chromaticity Diagram:

$$y \leq 0.335; \text{ and}$$

$$z \leq 0.002.$$

Suitable red LEDs include the Osram Oslon LA CP7P (x=0.685, y=0.315) manufactured by Osram Opto Semiconductors GmbH of Regensberg, Germany; the CREE CLM2-REW (x=0.699, y=0.301) manufactured by Cree, Inc. of Durham, N.C., USA or other suitable high output red LED. (As used herein all x, y coordinates refer to the coordinates on the 1931 C.I.E. Chromaticity Diagram.)

The white LEDs may be any conventional white LED having sufficient luminous output. For reasons that will be discussed more fully hereinafter, however, the chromaticity of the white LEDs may be, but is not necessarily within the definition of Aviation White, which is defined by the following formula on the 1931 C.I.E. Chromaticity Diagram:

$$x \geq 0.300 \text{ and } x \leq 0.540;$$

$$y \geq (x-0.040; \text{ or } y0-0.010), \text{ whichever is the smaller; and}$$

$$y \leq (x+0.020) \text{ and } y \leq 0.636-0.400x;$$

Where y0 is the y coordinate of the Planckian radiator for the value of x considered.

Suitable white LEDs include the Nichia NCSW119A (bin c1, x=0.330, y=0.339) manufactured by Nichia Corporation of Tokushima, Japan, the CREE XP-E cool white (x=0.311, y=0.322) manufactured by Cree, Inc. of Durham, N.C., USA or other suitable high output white LED.

Figure 3:
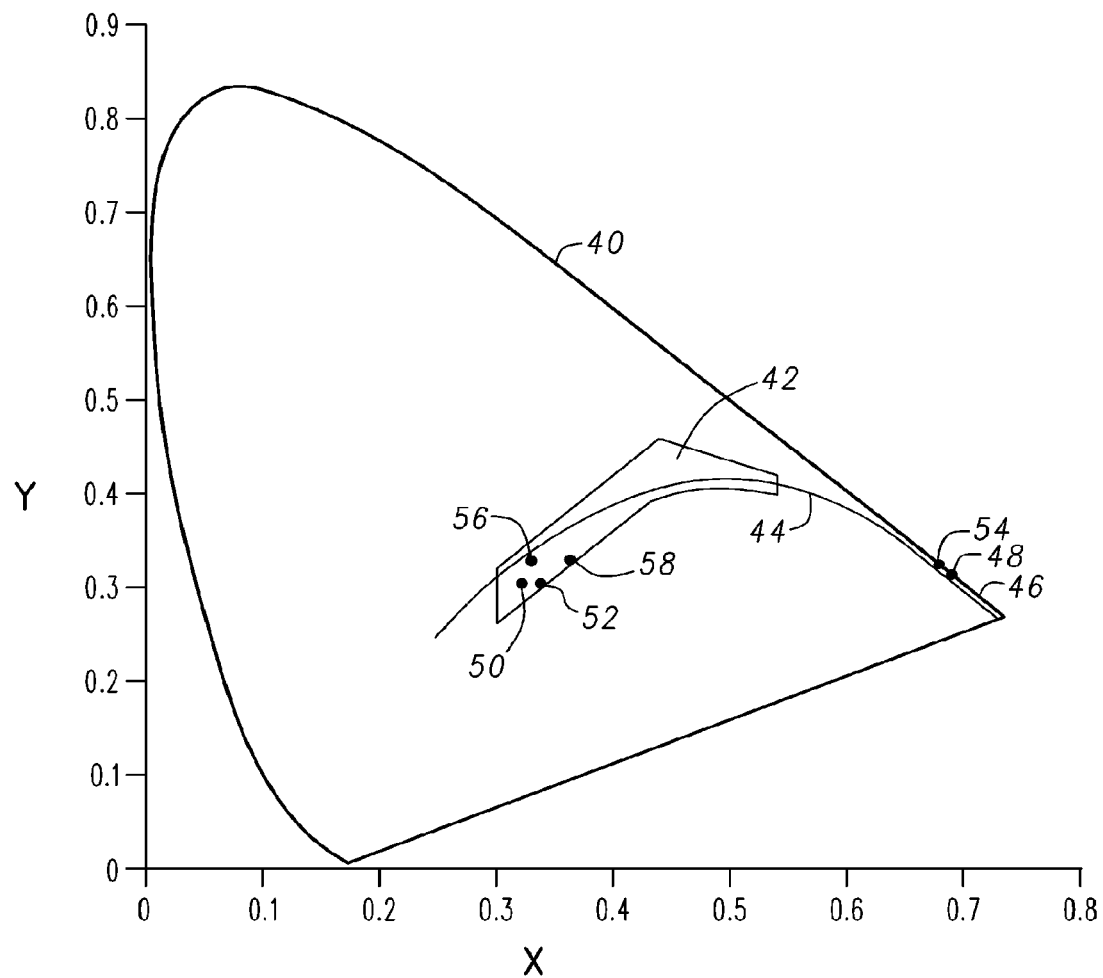
FIG. 3 is a copy of the 1931 CIE Chromaticity Chart showing the chromaticity performance of two embodiments of an Anti-Collision Light incorporating features of the present invention.

FIG. 3 is a reproduction of the 1931 C.I.E. Chromaticity Diagram which depicts, in two-dimensional form, the gamut of human vision (shown at reference 40). Within the gamut of human vision 40, the region known as Aviation White is shown at reference 42 in FIGS. 3 and 5. The Planckian radiator is shown at reference 44 in FIG. 3 and a portion thereof in FIG. 5. The region known as Aviation Red is shown at reference 46 in FIG. 3 and in FIG. 4.

Figure 4:
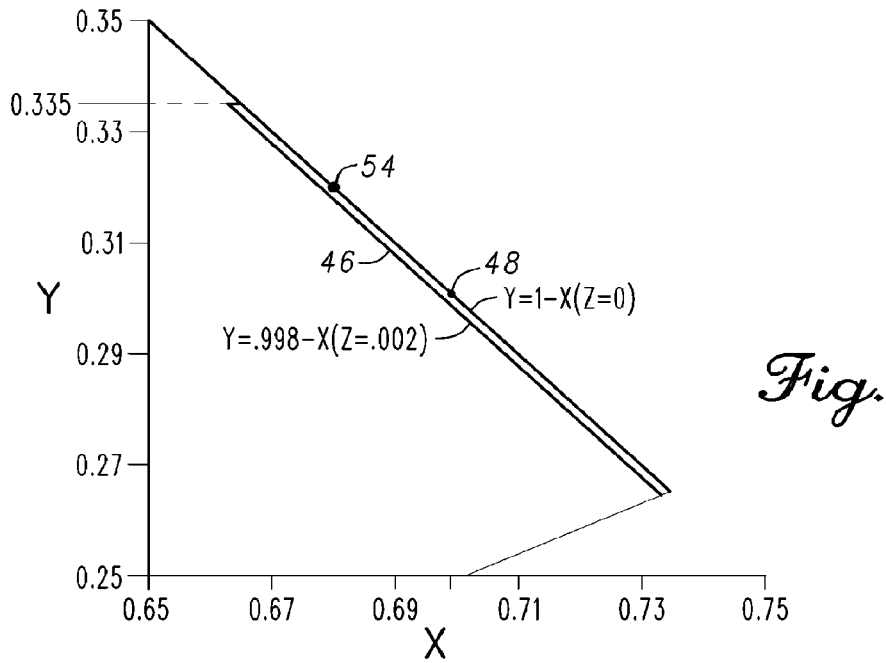
FIG. 4 is an enlarged view of the Aviation Red portion of the chart of FIG. 3.
Figure 5:
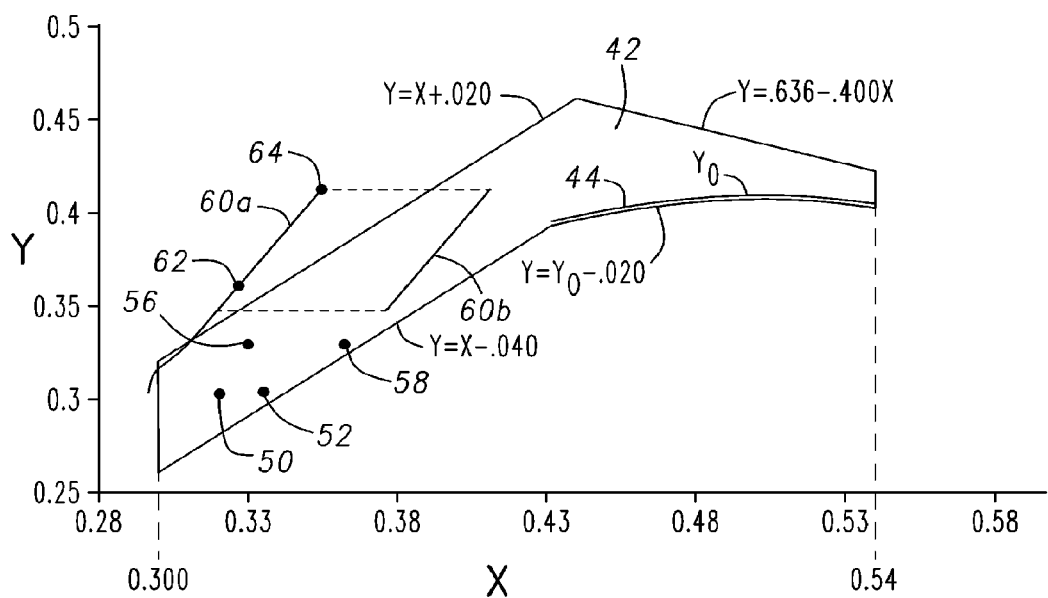
FIG. 5 is an enlarged view of the Aviation White portion of the chart of FIG. 3.

As shown in Table 1 below, and with reference to FIGS. 3-5, in a first illustrative embodiment of an ACL 30 incorporating features of the present invention, ACL 30 comprises an array of 46 white LEDs and 4 red LEDs. When operated in the red mode, the four red LEDs produce a luminous output of 200 cd with a center wavelength of 615 nm (which corresponds to a chromaticity of (x=0.692, y=0.0.308). This light output is within the definition of Aviation Red as shown in FIGS. 3 and 4 as reference 48. If the white LEDs are operated by themselves, the white LEDs alone produce a luminous output of 4600 cd with a chromaticity of (x=0.321, y=0.303) which is within the definition of Aviation White as shown in FIGS. 3 and 5 as reference 50. If, however, the red and white LEDs are operated simultaneously, the luminous output increases to 4800 cd with a chromaticity of (x=0.338, y=0.304) which remains within the definition of aviation white as shown in FIG. 3 and five as reference 52.

In a second illustrative embodiment, ACL 30 comprises an array of 41 white LEDs and nine red LEDs. When operated in the red mode, the nine red LEDs produce a luminous output of 450 cd with a center wavelength of 620 nm (which corresponds to a chromaticity of (x=0.680, y=0.320)). This light output is within the definition of Aviation Red as shown in FIGS. 3 and 4 as reference 54. If the white LEDs are operated by themselves, the white LEDs alone produce a luminous output of 4100 cd with a chromaticity of (x=0.330, y=0.330), which is just within the definition of Aviation White as shown in FIGS. 3 and 5 as reference 56. If, however, the red and white LEDs are operated simultaneously, the luminous output increases to 4550 cd with a chromaticity of (x=0.364, y=0.330) which is safely within the definition of Aviation White as shown in FIGS. 3 and 5 as reference 58. As can be determined from the foregoing, because the red LEDs 36 are selected to emit Aviation Red light having a center wavelength of between 615 nm (x=0.680, y=0.320) and 620 nm (x=0.692, y=0.308), the color shift caused by mixing the red LEDs 36 with the white LEDs 34 has the effect of increasing the x-coordinate of the combined light output with little or no change in the y-coordinate.

TABLE 1

| Total number of LEDs | 50 | 50 | 50 | 75 |
| --- | --- | --- | --- | --- |
| % of red LEDs | 8% | 18% | 20% | 20% |
| Number of red LEDs | 4 | 9 | 10 | 15 |
| Number of white LEDs | 46 | 41 | 40 | 60 |
| Luminous output per red LED (cd) | 50 | 50 | 50 | 50 |
| Luminous output per white LED (cd) | 100 | 100 | 100 | 100 |
| Luminous output, red mode (cd) | 200 | 450 | 500 | 750 |
| Luminous output, white LEDs only (cd) | 4600 | 4100 | 4000 | 6000 |
| Luminous output, white mode (red and white LEDs) | 4800 | 4550 | 4500 | 6750 |
| Red % of total luminous output | 4.2% | 9.9% | 11.1% | 11.1% |
| % Luminous output increase over white mode | 4.3% | 11.0% | 12.5% | 12.5% |

Additional embodiments increase the ratio of red LEDs to white LEDs and the total number of LEDs in the array as shown in Table 1. Typically the red LEDs will have a combined luminous output of less than 500 cd while the luminous output in the white mode (red and white LEDs) will have an output of at least 1000 cd. Ordinarily at least 1% of the combined light output is from the red LEDs however, 4-5%, 10%, 20% or more is possible depending on the application and the amount of red-shift desired.

As noted hereinbefore, as white LEDs age and/or are exposed to elevated temperatures, the phosphor deteriorates. This causes a color-shift in the chromaticity of the LEDs. For example, as shown at reference 60a, an XPG white LED operated at 60° C. color-shifts from a nominal chromaticity of (x=0.2890, y=0.2868) to a chromaticity of (x=0.3230, y=0.3533) after 3800 hours of operation, which is outside the definition of Aviation White as shown in FIG. 5 at reference 62. After 9600 hours of operation, the chromaticity has shifted even further to (x=0.35498, y=0.4115), which is even further outside the definition of Aviation White as shown in FIG. 5 at reference 64. Nevertheless, because the red LEDs 36 are chosen to have light output in the range of 615-620 nm, color mixing a suitable proportion of red LEDs 36 with the white LEDs has the effect of increasing the x-coordinate of the entire color-aged behavior of the white LEDs without significant impact on the y-coordinate. This causes the combined light output to color-shift so that it is well within the definition of aviation white despite the age and/or temperature degradation of the white LEDs as shown in FIG. 5 reference 60*b*.

Although certain illustrative embodiments and methods have been disclosed herein, it will be apparent from the foregoing disclosure to those skilled in the art that variations and modifications of such embodiments and methods may be made without departing from the invention. For example, although in the illustrative embodiment, the red LEDs were selected to have a center wavelength of 615-620 nm, other Aviation Red LEDs having a center wavelength of greater than 620 nm or less than 615 nm may be utilized if a greater impact on the y-coordinate of the combined light output is desired. Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "substantially" or "approximately" when used with mathematical concepts or measurements mean within ±10 degrees of angle or within 10 percent of the measurement, whichever is greater.

What is claimed is:

1. A method of operating an anti-collision light to produce an anti-collision light beam from an aircraft, comprising:

producing white light from one or more white light emitting diodes (LEDs) mounted in a housing; and red-shifting the produced white light to generate a combined light output by simultaneously producing Aviation Red light from one or more red LEDs, the red LEDs being mounted in the housing, wherein the red LEDs comprise between 5% and 25% of the total number of LEDs, wherein the total number of LEDs is the number of red LEDs plus the number of white LEDs, wherein the red-shifting is configured to maintain a combined light output within the definition of Aviation White over an operational life of the one or more white LEDs.

2. The method of claim 1, wherein the one or more white LEDs and the one or more red LEDs are arranged along a common plane.

3. The method of claim 1, wherein at least 1% of the intensity of the anti-collision light beam is produced by the one or more red LEDs.

4. The method of claim 1, wherein the light produced from the one or more white LEDs has an intensity of at least 1000 candela and the light produced from the one or more red LEDs has an intensity of less than 500 candela.

5. The method of claim 1, wherein the one or more red LEDs has a light output range of between about 615 nm and about 620 nm.

6. The method of claim 1, wherein the white LEDs outnumber the red LEDs by a ratio of 4 white LEDs for every red LED.

7. The method of claim 1, wherein the number of red LEDs is between 4 and 15 and the number of white LEDs is between 45 and 60.

8. The method of claim 1, wherein between 4% and 12% of the intensity of the anti-collision light beam is produced by the one or more red LEDs.

9. The method of claim 1, further comprising adjusting the number of red-light generating red LEDs based on a chromaticity of the output the one or more white LEDs such that a combined light output within the definition of Aviation White is maintained.

* * * * *